United States Patent
Tsuchiya et al.

(10) Patent No.: US 11,099,564 B2
(45) Date of Patent: Aug. 24, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Masamitsu Tsuchiya, Wako (JP); Hideki Matsunaga, Wako (JP); Yasuharu Hashimoto, Wako (JP); Etsuo Watanabe, Wako (JP); Yuki Oshitani, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 248 days.

(21) Appl. No.: 16/290,985

(22) Filed: Mar. 4, 2019

(65) Prior Publication Data
US 2019/0278270 A1 Sep. 12, 2019

(30) Foreign Application Priority Data

Mar. 8, 2018 (JP) .............................. JP2018-042330

(51) Int. Cl.
*G05D 1/00* (2006.01)
*G05D 1/02* (2020.01)

(52) U.S. Cl.
CPC ......... *G05D 1/0088* (2013.01); *G05D 1/0246* (2013.01); *G05D 1/0257* (2013.01)

(58) Field of Classification Search
CPC .. G05D 1/0088; G05D 1/0246; G05D 1/0257; B60W 2554/4029; B60W 60/0011; B60W 30/0956; B60W 30/18; B60W 30/08; B60W 40/04
See application file for complete search history.

(56) References Cited

U.S. PATENT DOCUMENTS

| 6,259,990 B1* | 7/2001 | Shojima ................ G01C 21/20 701/420 |
| 10,730,531 B1* | 8/2020 | Phillips ................. G06N 20/00 |
| 2017/0057497 A1* | 3/2017 | Laur .................. G06K 9/00348 |
| 2018/0143644 A1* | 5/2018 | Li ....................... G06K 9/00362 |
| 2018/0194354 A1* | 7/2018 | Takeda ............... B60W 60/001 |
| 2019/0066509 A1* | 2/2019 | Dellock ................ G08G 1/166 |
| 2019/0108753 A1* | 4/2019 | Kaiser .................... H04W 4/02 |
| 2019/0113916 A1* | 4/2019 | Guo ................. B60W 60/0015 |
| 2020/0290643 A1* | 9/2020 | Ueda ............... B60W 30/18163 |

FOREIGN PATENT DOCUMENTS

| CN | 110716552 A | * | 1/2020 |
| JP | 2009-067382 | | 4/2009 |
| JP | 5692024 B2 | * | 4/2015 |

\* cited by examiner

Primary Examiner — Donald J Wallace
(74) Attorney, Agent, or Firm — Amin, Turocy & Watson, LLP

(57) ABSTRACT

A vehicle control device (100) includes a recognition unit (130) that recognizes a surrounding situation of a vehicle, and a driving control unit (140, 160) that controls steering and acceleration and deceleration of the vehicle based on the surrounding situation recognized by the recognition unit. In a case where a traffic participant is recognized in a progress direction of the vehicle by the recognition unit, the driving control unit sets an entry inhibition region where an entry of the vehicle is to be avoided, using the traffic participant as a reference, based on a degree of recognition of the vehicle by the traffic participant.

7 Claims, 12 Drawing Sheets

| TRAFFIC PARTICIPANT RECOGNITION STATE | DEGREE OF RECOGNITION |
|---|---|
| IS NOT AWARE OF | 0 |
| TURNS BACK | 30 |
| IS AWARE OF | 50 |
| STOPS AFTER TURNING BACK | 75 |
| APPROACHES ROAD END PORTION AFTER TURNING BACK | 90 |
| ... | ... |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-042330, filed Mar. 8, 2018, the content of which is incorporated herein by reference.

BACKGROUND

Field of the Invention

The present invention relates to a vehicle control device, a vehicle control method, and a storage medium.

Description of Related Art

In the related art, a technique of detecting a pedestrian around a vehicle and informing the detected pedestrian of the presence of the vehicle is known. In relation to this, a technique of controlling a driving amount of an engine in a case where a pedestrian around a vehicle is detected, and informing the pedestrian of the presence of the vehicle by using an operation sound of the engine by driving is known (for example, Japanese Unexamined Patent Application, First Publication No. 2009-067382).

SUMMARY

However, according to the related art, how to control a distance to a pedestrian in a case where the pedestrian around the vehicle is detected has not been considered. In a case where the vehicle is an automated driving vehicle, driving control for overtaking the pedestrian is executed while keeping a constant interval in order to avoid coming into contact with the detected pedestrian, but since a state of the pedestrian is not considered, there was a case where an unnecessary interval was spaced or there was a case where the interval was not sufficient and thus the pedestrian was surprised at a time of overtaking.

An aspect of the present invention has been made in consideration of such circumstances, and an object of the aspect of the present invention is to provide a vehicle control device, a vehicle control method, and a storage medium capable of executing a more suitable overtaking driving control on the basis of a state of a traffic participant.

A vehicle control device, a vehicle control method, and a storage medium according to the present invention adopt the following constitutions.

(1): A vehicle control device according to an aspect of the present invention includes a recognition unit that recognizes a surrounding situation of a vehicle, and a driving control unit that controls steering and acceleration and deceleration of the vehicle based on the surrounding situation recognized by the recognition unit. In a case where a traffic participant is recognized in a progress direction of the vehicle by the recognition unit, the driving control unit sets an entry inhibition region where an entry of the vehicle is to be avoided, using the traffic participant as a reference, based on a degree of recognition of the vehicle by the traffic participant.

(2): A vehicle control device according to an aspect of the present invention includes a recognition unit that recognizes a surrounding situation of a vehicle, and a driving control unit that controls steering and acceleration and deceleration of the vehicle based on the surrounding situation recognized by the recognition unit. In a case where a traffic participant is recognized in a progress direction of the vehicle by the recognition unit, the driving control unit sets a distance between the traffic participant and the vehicle based on a degree of recognition of the vehicle by the traffic participant and executes driving control for overtaking the traffic participant based on the set distance.

(3): In the aspect of (1) described above, the driving control unit estimates the degree of recognition based on one or both of a line-of-sight or a motion of the traffic participant recognized by the recognition unit.

(4): In the aspect of (1) described above, the driving control unit reduces the entry inhibition region of a case where it is estimated that the traffic participant is aware of the vehicle as compared with a case where it is estimated that the traffic participant is not aware of the vehicle, based on one or both of a line-of-sight or a motion of the traffic participant recognized by the recognition unit.

(5): In the aspect of (4) described above, the driving control unit expands the entry inhibition region of a case where it is estimated that the traffic participant is turning back until it is estimated that the traffic participant is turning back and then a predetermined time elapses as compared with a case where it is estimated that the traffic participant is not aware of the vehicle, based on the one or both of the line-of-sight or motion of the traffic participant.

(6): In the aspect of (5) described above, the driving control unit reduces the entry inhibition region after it is estimated that the traffic participant is turning back and then the predetermined time elapses as compared with a case where it is estimated that the traffic participant is not aware of the vehicle.

(7): In the aspect of (1) described above, the driving control unit reduces the entry inhibition region of a case where a motion for the traffic participant to cause the vehicle to overtake is estimated as compared with a case where it is estimated that the traffic participant is not aware of the vehicle, based on one or both of a line-of-sight or a motion of the traffic participant recognized by the recognition unit.

(8): A vehicle control device according to an aspect of the present invention includes a recognition unit that recognizes a surrounding situation of a vehicle, and a driving control unit that controls steering and acceleration and deceleration of the vehicle based on the surrounding situation recognized by the recognition unit. In a case where a traffic participant is recognized in a progress direction of the vehicle by the recognition unit, the driving control unit categorizes a pattern of a behavior of the traffic participant, and sets an entry inhibition region where an entry of the vehicle is to be avoided, using the traffic participant as a reference, based on the categorized pattern of the behavior.

(9): A vehicle control method according to an aspect of the present invention causes a vehicle control device to recognize a surrounding situation of a vehicle, and control steering and acceleration and deceleration of the vehicle based on the recognized surrounding situation. In a case where a traffic participant is recognized in a progress direction of the vehicle, an entry inhibition region where an entry of the vehicle is to be avoided is set, using the traffic participant as a reference, based on a degree of recognition of the vehicle by the traffic participant.

(10): A computer-readable non-transitory storage medium according to another aspect of the present invention stores a program that causes a vehicle control device to recognize a surrounding situation of a vehicle, and control steering and acceleration and deceleration of the vehicle based on the recognized surrounding situation. In a case where a traffic participant is recognized in a progress direction of the vehicle, an entry inhibition region where an entry of the vehicle is to be avoided is set, using the traffic participant as a reference, based on a degree of recognition of the vehicle by the traffic participant.

According to aspects of (1) to (10) described above, it is possible to execute a more suitable overtaking driving control on the basis of a state of a traffic participant.

BRIEF DESCRIPTION OF THE DRAWINGS

FIG. 4 is a diagram showing an example of a content of degree of recognition table.

DESCRIPTION OF EMBODIMENTS

Hereinafter, embodiments of a vehicle control device, a vehicle control method, and a storage medium of the present invention will be described with reference to the drawings. A case where left-side driving is applied to the present invention will be described below, but in a case where right-side is applied to the present invention, it is only necessary to reverse left and right.

First Embodiment

[Overall Constitution]

Figure 1:
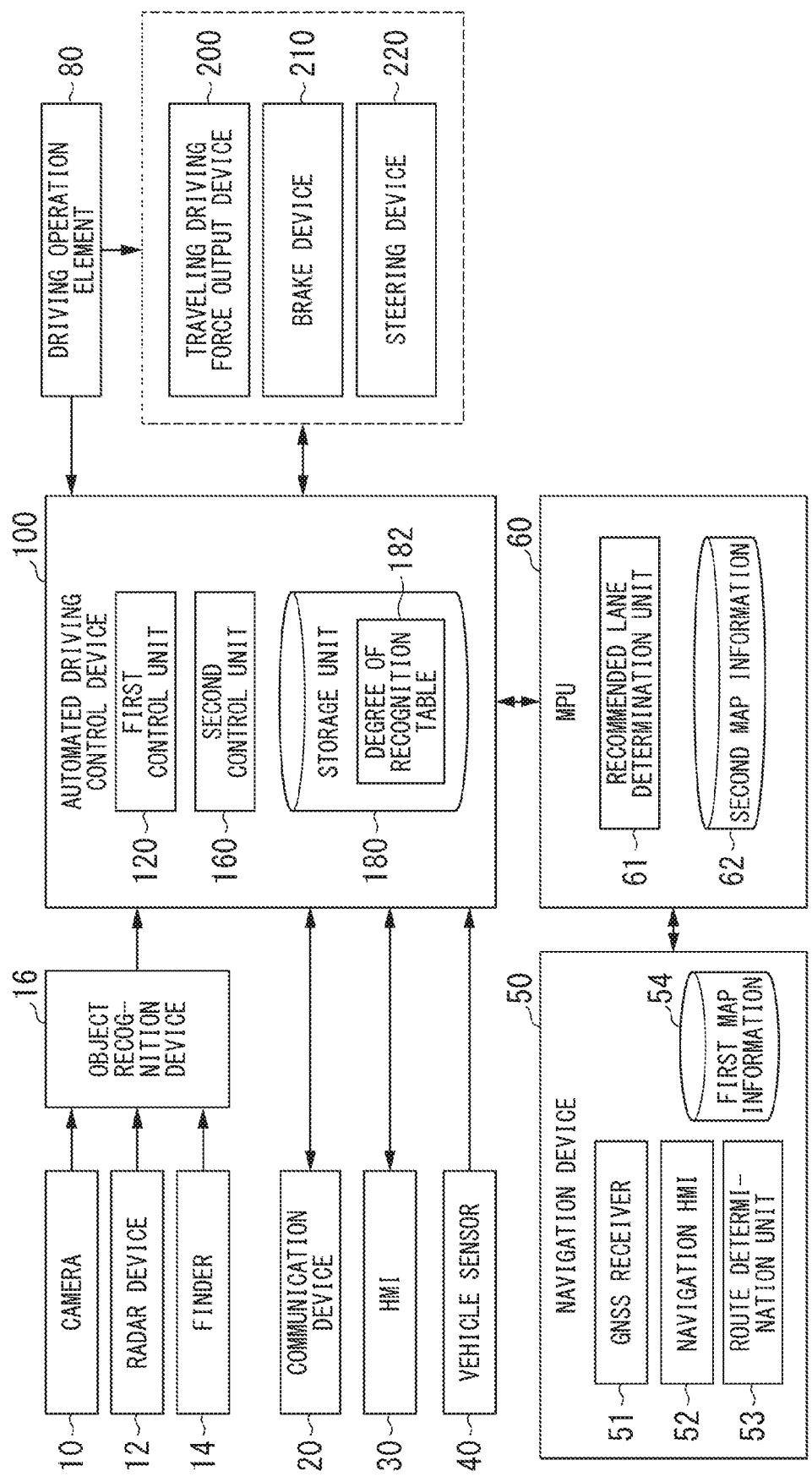
FIG. 1 is a constitution diagram of a vehicle system using a vehicle control device according to a first embodiment.

FIG. 1 is a constitution diagram of a vehicle system 1 using the vehicle control device according to a first embodiment. A vehicle in which the vehicle system 1 is mounted is, for example, a vehicle such as a two-wheeled vehicle, a three-wheeled vehicle, or a four-wheeled vehicle, and a driving source of the vehicle includes an internal combustion engine such as a diesel engine or a gasoline engine, an electric motor, or a combination thereof. The electric motor operates using electric power generated by a generator connected to the internal combustion engine, or discharge power of a secondary battery or a fuel cell.

For example, the vehicle system 1 includes a camera 10, a radar device 12, a finder 14, an object recognition device 16, a communication device 20, a human machine interface (HMI) 30, a vehicle sensor 40, a navigation device 50, a map positioning unit (MPU) 60, a driving operation element 80, an automated driving control device 100, a traveling driving force output device 200, a brake device 210, and a steering device 220. Such devices and instruments are connected to each other by a multiplex communication line such as a controller region network (CAN) communication line, a serial communication line, a wireless communication network, or the like. The constitution shown in FIG. 1 is merely an example, and a part of the constitution may be omitted or other constitutions may be further added. The automated driving control device 100 is an example of a "vehicle control device".

For example, the camera 10 is a digital camera using a solid imaging element such as a charge coupled device (CCD) or a complementary metal oxide semiconductor (CMOS). The camera 10 is attached to an arbitrary place on a subject vehicle (hereinafter referred to as a subject vehicle M) on which the vehicle system 1 is mounted. In a case of forward imaging, the camera 10 is attached to an upper portion of a front windshield, a rear surface of a rearview mirror, or the like. For example, the camera 10 periodically repeats imaging of the surroundings of the subject vehicle M. The camera 10 may be a stereo camera.

The radar device 12 radiates radio waves such as millimeter waves or the like to the surroundings of the subject vehicle M and detects at least the position (distance and direction) of an object by detecting radio waves (reflected waves) reflected by the object. The radar device 12 is attached to an arbitrary place on the subject vehicle M. The radar device 12 may detect the position and the speed of the object by a frequency modulated continuous wave (FM-CW) method.

The finder 14 is a light detection and ranging (LIDAR). The finder 14 irradiates light around the subject vehicle M and measures scattered light. The finder 14 detects the distance to the object on the basis of a time from light emission to light reception. For example, the irradiated light is laser light of a pulse shape. The finder 14 is attached to an arbitrary place on the subject vehicle M.

The object recognition device 16 performs a sensor fusion process on a detection result of some or all of the camera 10, the radar device 12, and the finder 14 to recognize a position, a type, a speed, and the like of the object. The object recognition device 16 outputs a recognition result to the automated driving control device 100. The object recognition device 16 may output the detection result of the camera 10, the radar device 12, and the finder 14 as they are to the automated driving control device 100. The object recognition device 16 may be omitted from the vehicle system 1.

For example, the communication device 20 communicates with another vehicle near the subject vehicle M using a cellular network, a Wi-Fi network, Bluetooth (registered trademark), dedicated short range communication (DSRC), or the like, or communicates with various server devices through a wireless base station.

The HMI 30 presents various types of information to an occupant of the subject vehicle M and receives an input operation by the occupant. The HMI 30 includes various display devices, speakers, buzzers, touch panels, switches, keys, and the like.

The vehicle sensor 40 includes a vehicle speed sensor that detects a speed of the subject vehicle M, an acceleration sensor that detects acceleration, a yaw rate sensor that detects an angular velocity around a vertical axis, a direction sensor that detects a direction of the subject vehicle M, and the like. The vehicle sensor 40 may include a seat position detection sensor that detects a position of a driver's seat on which the occupant is seated.

For example, the navigation device 50 includes a global navigation satellite system (GNSS) receiver 51, a navigation HMI 52, and a route determination unit 53. The navigation device 50 holds first map information 54 in a storage device such as a hard disk drive (HDD) or a flash memory. The GNSS receiver 51 specifies the position of the subject vehicle M on the basis of a signal received from a GNSS satellite. The position of the subject vehicle M may be specified or supplemented by an inertial navigation system using an output of the vehicle sensor 40. The navigation HMI 52 includes a display device, a speaker, a touch panel, a key, and the like. A part or all of the navigation HMI 52 may be shared with the above-described HMI 30. For example, the route determination unit 53 determines a route (hereinafter referred to as a route on a map) from the position of the subject vehicle M specified by the GNSS receiver 51 (or an input arbitrary position) to a destination input by the occupant using the navigation HMI 52 by referring to the first map information 54. For example, the first map information 54 is information in which a road shape is expressed by a link indicating a road and nodes connected by the link. The first map information 54 may include a curvature of the road, point of interest (POI) information, or the like. The route on the map is output to the MPU 60. The navigation device 50 may perform route guidance using the navigation HMI 52 on the basis of the route on the map. For example, the navigation device 50 may be realized by a function of a terminal device such as a smartphone or a tablet terminal possessed by the user. The navigation device 50 may transmit a current position and a destination to a navigation server through the communication device 20 and acquire the same route as the route on the map from the navigation server.

For example, the MPU 60 includes a recommended lane determination unit 61 and holds second map information 62 in the storage device such as an HDD or a flash memory. The recommended lane determination unit 61 divides the route on the map provided from the navigation device 50 into a plurality of blocks (for example, divides the route into intervals of 100 [m] in a vehicle progress direction), and determines a recommended lane for each block by referring to the second map information 62. The recommended lane determination unit 61 determines the number of a lane from the left that the vehicle travels in. In a case where there is a branching position on the route on the map, the recommended lane determination unit 61 determines the recommended lane so that the subject vehicle M is able to travel on a reasonable travel route for progressing to a branch destination.

The second map information 62 is map information with higher accuracy than the first map information 54. For example, the second map information 62 may include information on the center of the lane, information on the boundary of the lane, and the like. The second map information 62 may include road information, traffic regulation information, address information (an address and a postal code), facility information, telephone number information, and the like.

The second map information 62 may be updated at any time by the communication device 20 communicating with another device.

The driving operation element 80 includes, for example, an acceleration pedal, a brake pedal, a shift lever, a steering wheel, a modified steering wheel, a joystick, and other operation elements. A sensor that detects an operation amount or presence or absence of an operation is attached to the driving operation element 80, and a detection result of the sensor is output to a part or all of the automated driving control device 100, or the traveling driving force output device 200, the brake device 210, and the steering device 220.

For example, the automated driving control device 100 includes a first control unit 120, a second control unit 160, and a storage unit 180. For example, each of such constitution elements is realized by a hardware processor such as a central processing unit (CPU) executing a program (software). Some or all of such constitution elements may be realized by hardware (a circuit unit including a circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device such as a HDD or a flash memory of the automated driving control device 100 in advance, may be stored in a detachable storage medium such as a DVD or a CD-ROM (for example, a computer-readable non-transitory storage medium), or may be installed in the HDD or the flash memory of the automated driving control device 100 by attaching the storage medium to the drive device. A combination of the action plan generation unit 140 and the second control unit 160 is an example of a "driving control unit". For example, the driving control unit controls steering and acceleration and deceleration of the subject vehicle M on the basis of the surrounding situation or the like recognized by the recognition unit 130.

Figure 2:
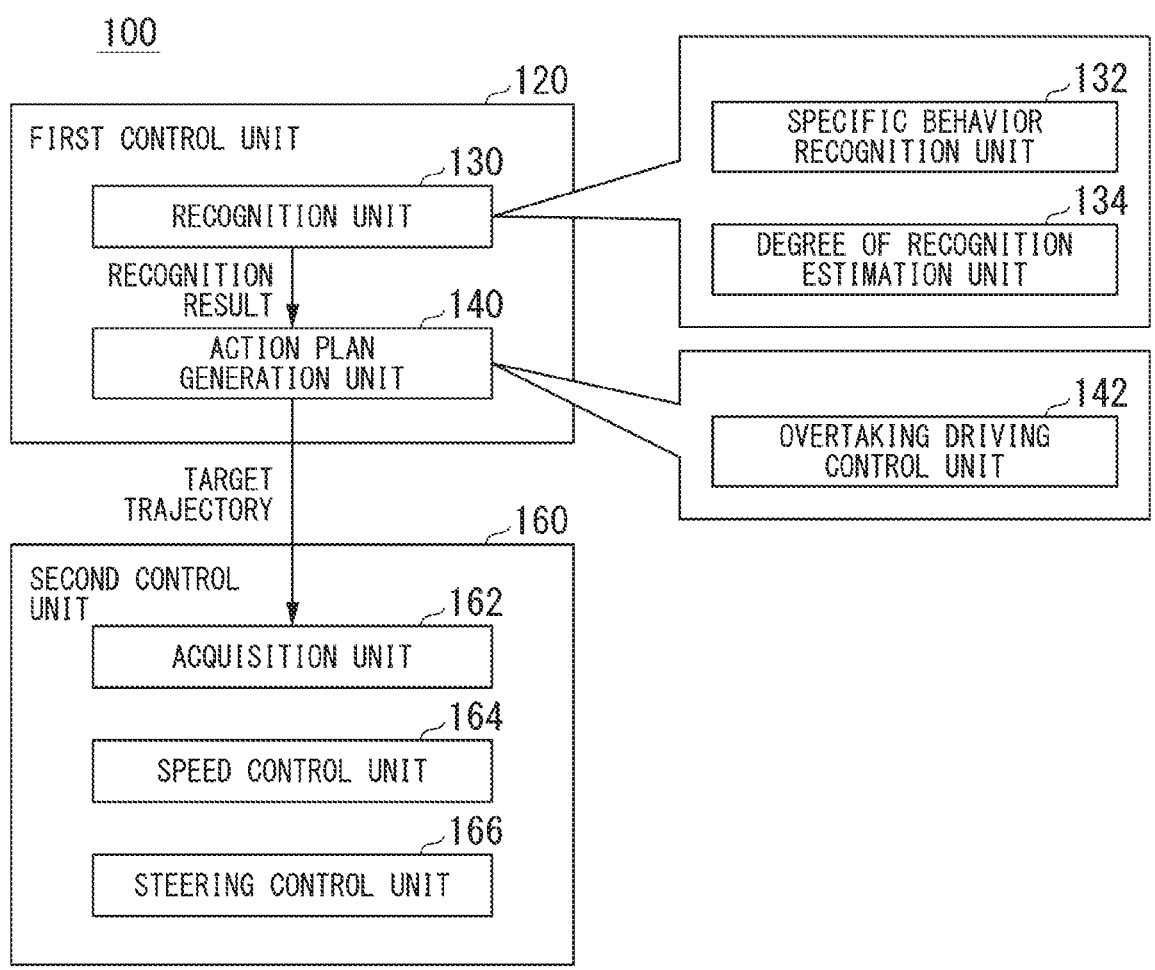
FIG. 2 is a functional constitution diagram of a first control unit and a second control unit according to the first embodiment.

FIG. 2 is a functional constitution diagram of the first control unit 120 and the second control unit 160 according to the first embodiment. For example, the first control unit 120 realizes a function of artificial intelligence (AI) and a function of a previously given model in parallel. For example, a function of "recognizing an intersection" is executed in parallel with recognition of an intersection by deep learning or the like and recognition based on a previously given condition (there is a pattern matching signal, a road sign, or the like) and may be realized by giving scores to both sides and comprehensively evaluating the scores. Therefore, reliability of automated driving is guaranteed.

The recognition unit 130 detects a position, a state such as a speed, an acceleration, and the like of the object in the vicinity of the subject vehicle M on the basis of the information input from the camera 10, the radar device 12, and the finder 14 through the object recognition device 16. The object includes, for example, a traffic participant, a moving body such as another vehicle, and an obstacle of a construction site or the like. For example, the traffic participant is a moving body that is present on a road on which the subject vehicle M travels and is anticipated to move at a speed lower than that of a traveling speed of the subject vehicle M. The traffic participant includes, for example, a pedestrian, a bicycle, and a wheelchair. Hereinafter, the pedestrian will be described among the traffic participants. For example, the position of the object is recognized as a position on an absolute coordinate (that is, a relative position with respect to the subject vehicle M) using a representative point (center of gravity, driving axis center, or the like) of the subject vehicle M as an origin and is used for control. The position of the object may be represented by a representative point such as a center of gravity or a corner of the object, or may be represented by an expressed region. In a case where the object is another vehicle, the "state" of the object may include an acceleration or jerk of the object, or "behavioral state" (for example, the object changes a lane or whether or not the object is about to change the lane). In a case where the object is the pedestrian, the "state" of the object may include a direction in which the object moves, or an "action state" (for example, whether or not the object is crossing the road or not, or whether or not the object is about to cross the road).

For example, the recognition unit 130 recognizes a lane (road) on which the subject vehicle M is traveling. For example, the recognition unit 130 recognizes a traveling lane by comparing a pattern of a road lane marking (for example, an arrangement of a solid line and a broken line) obtained from the second map information 62 with a pattern of a road lane marking near the subject vehicle M recognized from the image captured by the camera 10. The recognition unit 130 may recognize the traveling lane by recognizing a traveling road boundary (a road boundary) including a road lane marking, a road shoulder, a curb, a median strip, a guardrail, and the like, and is not limited to recognizing road lane markings. The recognition unit 130 may recognize the number of lanes that are able to progress in the same direction. In such recognitions, the position of the subject vehicle M acquired from the navigation device 50 and a process result by INS may be added. The recognition unit 130 recognizes a width of the road on which the subject vehicle M travels. In this case, the recognition unit 130 may recognize the road width from the image captured by the camera 10, or may recognize the road width from the road lane marking obtained from the second map information 62. The recognition unit 130 may recognize a width (for example, a width of another vehicle) or a height, a length, a shape, and the like of the obstacle on the basis of the image captured by the camera 10. The recognition unit 130 recognizes a temporary stop line, a red light, a road sign, a toll booth, and other road events.

When recognizing the traveling lane, the recognition unit 130 recognizes the relative position and a posture of the subject vehicle M with respect to the traveling lane. For example, the recognition unit 130 may recognize an angle formed by a deviation of a representative point of the subject vehicle M from a center of the lane and a line connecting the center of the lane of a progress direction of the subject vehicle M as a relative position and the posture of the subject vehicle M with respect to the traveling lane. Instead of this, the recognition unit 130 may recognize a position or the like of the representative point of the subject vehicle M with respect to one of side end portions (the road lane marking or the road boundary) of the traveling lane as the relative position of the subject vehicle M with respect to the traveling lane. The recognition unit 130 may recognize a structure (for example, a utility pole, a median strip, and the like) on the road on the basis of the first map information 54 or the second map information 62. Functions of a specific behavior recognition unit 132 and a degree of recognition estimation unit 134 of the recognition unit 130 will be described later.

In principle, the action plan generation unit 140 generates a target trajectory in which the subject vehicle M travels in the future automatically (without depending on an operation of the driver) so that the subject vehicle M travels on the recommended lane determined by the recommended lane determination unit 61, and furthermore the subject vehicle M is able to cope with the surrounding situation. The target trajectory is a target trajectory through which the representative point of the subject vehicle M passes. The target trajectory includes, for example, a speed element. For example, the target trajectory is expressed as a sequence of points (trajectory points) that the subject vehicle M reaches. The trajectory points are points that the subject vehicle M reaches for each predetermined traveling distance (for example, about several [m]) at a road distance, and separately from that, a target speed and a target acceleration for each predetermined sampling time (for example, about 0 comma several [sec]) are generated as part of the target trajectory. The trajectory points may be positions that the subject vehicle M reaches at a sampling time for each predetermined sampling time. In this case, information on the target speed and the target acceleration is expressed by an interval between the trajectory points.

In generating the target trajectory, the action plan generation unit 140 may set an event of the automated driving. The event of the automated driving includes a constant speed traveling event, a low speed following traveling event, a lane change event, a branch event, a merge event, a takeover event, and the like. The action plan generation unit 140 generates a target trajectory according to an activated event. Functions of an overtaking driving control unit 142 of the action plan generation unit 140 will be described later.

The second control unit 160 controls the traveling driving force output device 200, the brake device 210, and the steering device 220 so that the subject vehicle M passes through the target trajectory generated by the action plan generation unit 140 at a scheduled time.

For example, the second control unit 160 includes an acquisition unit 162, a speed control unit 164, and a steering control unit 166. The acquisition unit 162 acquires information on the target trajectory (a trajectory point) generated by the action plan generation unit 140 and stores the information on the target trajectory in a memory (not shown). The speed control unit 164 controls the traveling driving force output device 200 or the brake device 210 on the basis of the speed element attached to the target trajectory that is stored in the memory. The steering control unit 166 controls the steering device 220 according to a degree of curvature of the target trajectory that is stored in the memory. For example, a process of the speed control unit 164 and the steering control unit 166 is realized by a combination of feed-forward control and feedback control. As an example, the steering control unit 166 is executed by a combination of feed-forward control according to a curvature of the road ahead of the subject vehicle M and feedback control based on the deviation from the target trajectory.

The storage unit 180 is realized by a HDD, a flash memory, a random access memory (RAM), a read only memory (ROM), or the like. For example, a degree of recognition table 182 and other information are stored in the storage unit 180. Details of the degree of recognition table 182 will be described later.

The traveling driving force output device 200 outputs, to driving wheels, traveling driving force (torque) for enabling the vehicle to travel. For example, the traveling driving force output device 200 includes a combination of an internal combustion engine, an electric motor, a transmission, and the like, and an ECU that controls the internal combustion engine, the electric motor, the transmission, and the like. The ECU controls the above-described constitutions according to the information input from the second control unit 160 or the information input from the driving operation element 80.

For example, the brake device 210 includes a brake caliper, a cylinder that transfers oil pressure to the brake caliper, an electric motor that generates the oil pressure in the cylinder, and a brake ECU. The brake ECU controls the electric motor according to the information input from the second control unit 160 or the information input from the driving operation element 80, so that a brake torque according to a control operation is output to each wheel. The brake device 210 may include a mechanism for transferring the oil pressure generated by an operation of a brake pedal included in the driving operation element 80 to the cylinder through a master cylinder as a backup. The brake device 210 is not limited to the constitution described above, and may be an electronic control method oil pressure brake device that controls an actuator according to the information input from the second control unit 160 to transfer the oil pressure of the master cylinder to the cylinder.

For example, the steering device 220 includes a steering ECU and an electric motor. For example, the electric motor changes a direction of steerable wheels by applying a force to a rack and pinion mechanism. The steering ECU changes the direction of the steerable wheels by driving the electric motor according to the information input from the second control unit 160 or the information input from the driving operation element 80.

[Function of Specific Behavior Recognition Unit]

Figure 3:
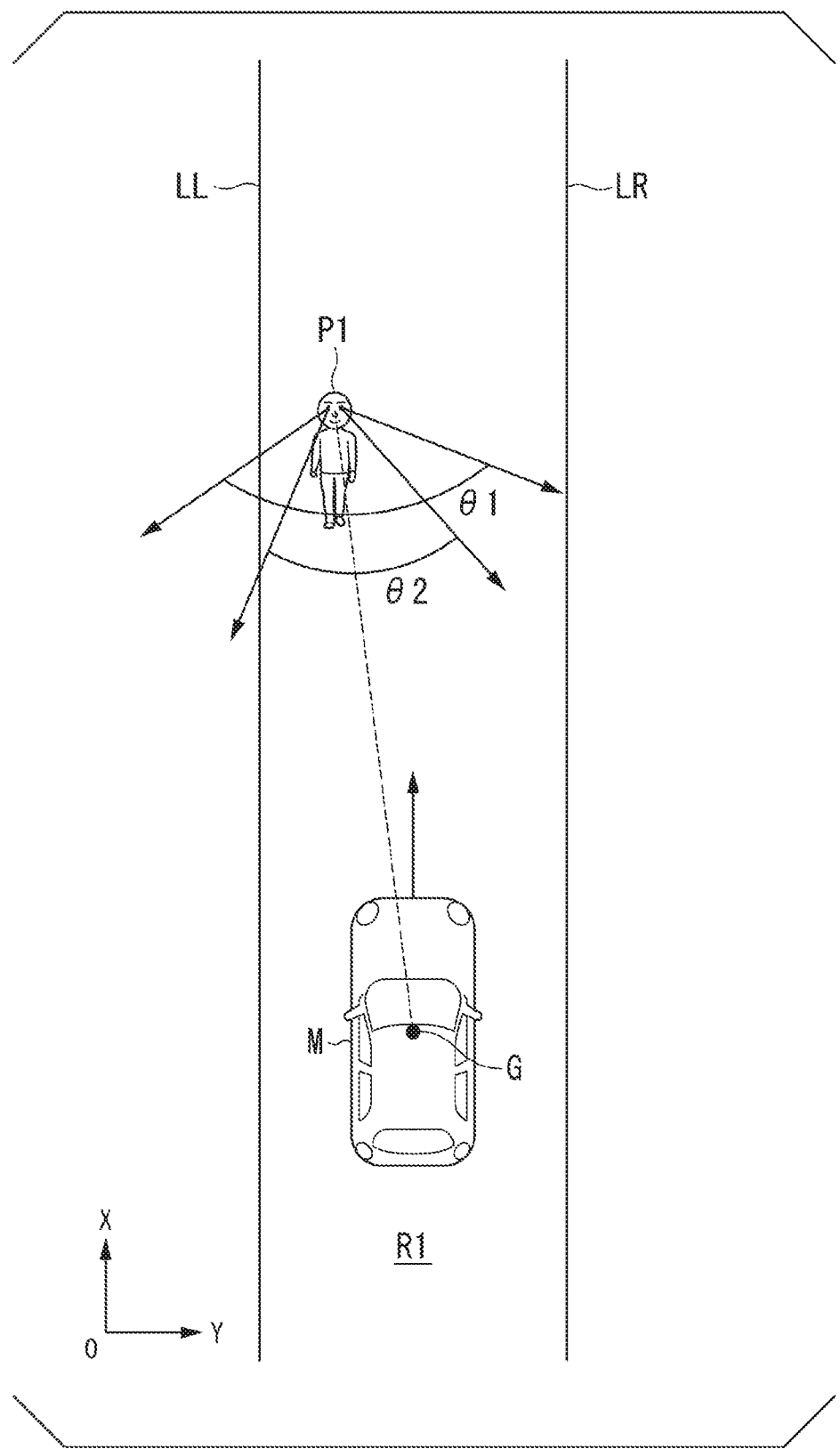
FIG. 3 is a diagram for explaining an example of a process of a specific behavior recognition unit.

The specific behavior recognition unit 132 recognizes a specific behavior of the pedestrian recognized by the recognition unit 130. The specific behavior is, for example, a behavior of a head or eyes for estimating a line-of-sight direction of the pedestrian, or motion of the pedestrian. FIG. 3 is a diagram for explaining an example of a process of the specific behavior recognition unit 132. In the example of FIG. 3, it is assumed that there is a pedestrian P1 walking in a progress direction similar to the subject vehicle M in the progress direction of the subject vehicle M traveling on a road R1 partitioned by left and right road lane markings LL and LR.

The specific behavior recognition unit 132 recognizes the specific behavior of the pedestrian P1 who is present in the progress direction of the subject vehicle M among the pedestrians that are present around the subject vehicle M recognized by the recognition unit 130. Specifically, for example, the specific behavior recognition unit 132 analyzes the image captured by the camera 10, and recognizes a position and an orientation of the head of the pedestrian P1 on the basis of luminance information and shape information of the analyzed image. The specific behavior recognition unit 132 may recognize a posture of an upper body of the pedestrian P1 and may recognize the position and the orientation of the head on the basis of the recognized posture of the upper body. Therefore, it is possible to improve accuracy of the position and the orientation of the head. In a case where a face of the pedestrian is able to be recognized by an analysis result of the image, the specific behavior recognition unit 132 may specify a region of the eye from feature information of the face and may recognize the line-of-sight direction of the pedestrian P1 from a position of an iris or a pupil in the specified region of the eye.

For example, the specific behavior recognition unit 132 may recognize a predetermined motion of the pedestrian P1 with respect to a detection result by some or all of the camera 10, the radar device 12, and the finder 14. The predetermined motion is, for example, a turning motion, a stopping motion, a motion of the pedestrian P1 approaching a road end side by itself and avoiding the subject vehicle M, and a gesture such as a body gesture or a hand gesture for causing the subject vehicle to overtake the pedestrian P1. The gesture may be, for example, a gesture of stopping while facing a center side of the road R1 or a hand gesture indicating the progress direction of the subject vehicle M with a hand or a finger.

[Function of Degree of Recognition Estimation Unit]

The degree of recognition estimation unit 134 calculates the degree of recognition of the subject vehicle M in the pedestrian P1 on the basis of the behavior of the pedestrian P1 recognized by the specific behavior recognition unit 132 and the degree of recognition table 182 stored in the storage unit 180.

FIG. 4 is a diagram showing an example of a content of the degree of recognition table 182. In the degree of recognition table 182, the degree of recognition is associated with a traffic participant recognition state. The traffic participant recognition state is, for example, a recognition state of the subject vehicle M by the pedestrian. The traffic participant recognition state includes, for example, a state in which the pedestrian "is not aware of the subject vehicle M", "turns back", "is aware of the subject vehicle M", "stops after turning back", or "approaches a road end portion after turning back". The traffic participant recognition state may include a state in which a predetermined gesture is performed. The degree of recognition is, for example, an index value indicating to what degree the pedestrian is able to recognize that the subject vehicle M is approaching or that the subject vehicle M is about to overtake. In the example of FIG. 4, it is assumed that it is estimated that the pedestrian P1 is able to recognize that the subject vehicle M is approaching or that the subject vehicle M is about to overtake as the value of the degree of recognition is high. Instead of a numerical value shown in FIG. 4, the degree of recognition may be an index value by a letter such as A, B, C, or the like.

For example, the recognition degree estimation unit 134 determines whether or not an orientation of the face of the pedestrian P1 is included within a range of a first angle θ1 around a line connecting a position of the face and a reference point (for example, a center of gravity G) of the subject vehicle M. In a case where the recognition degree estimation unit 134 determines that the orientation of the face is included within the range of the first angle θ1, the recognition degree estimation unit 134 estimates that the pedestrian P1 turns back. On the other hand, in a case where the recognition degree estimation unit 134 determines that the orientation of the face is not included within the range of the first angle θ1, the recognition degree estimation unit 134 estimates that the pedestrian P1 does not turn back.

In a case where the degree of recognition estimation unit 134 determines that the orientation of the face of the pedestrian P1 is included within a range of a second angle θ2 around the line connecting the position of the face and the reference point of the subject vehicle M, the degree of recognition estimation unit 134 estimates that the pedestrian P1 is aware of the subject vehicle M. In a case where the orientation of the face of the pedestrian P1 is not included within the range of the second angle θ2 and is included within the range of the first angle θ1, the degree of recognition estimation unit 134 estimates that the pedestrian P1 is not aware of the subject vehicle M. The first angle θ1 and the second angle θ2 may be changed according to the position, a walking speed, or the progress direction of the pedestrian P1.

In a case where the predetermined gesture is recognized by the degree of recognition estimation unit 134 by the specific behavior recognition unit 132, the degree of recognition estimation unit 134 may estimate that the pedestrian P1 is aware of the subject vehicle M. The degree of recognition estimation unit 134 may continuously recognize a change in the behavior of the pedestrian P1 by the specific behavior recognition unit 132, and may estimate a state in which the pedestrian P1 is stopped after turning back, a state in which the pedestrian P1 approaches the road end portion after turning back, or a state in which the pedestrian P1 is performing the predetermined gesture, on the basis of the recognized change in the behavior.

In addition, the degree of recognition estimation unit 134 collates an estimated result with the traffic participant recognition state of the degree of recognition table 182 stored in the storage unit 180, and acquires the degree of recognition corresponding to the matched traffic participant recognition state.

[Function of Overtaking Driving Control Unit]

Figure 5:
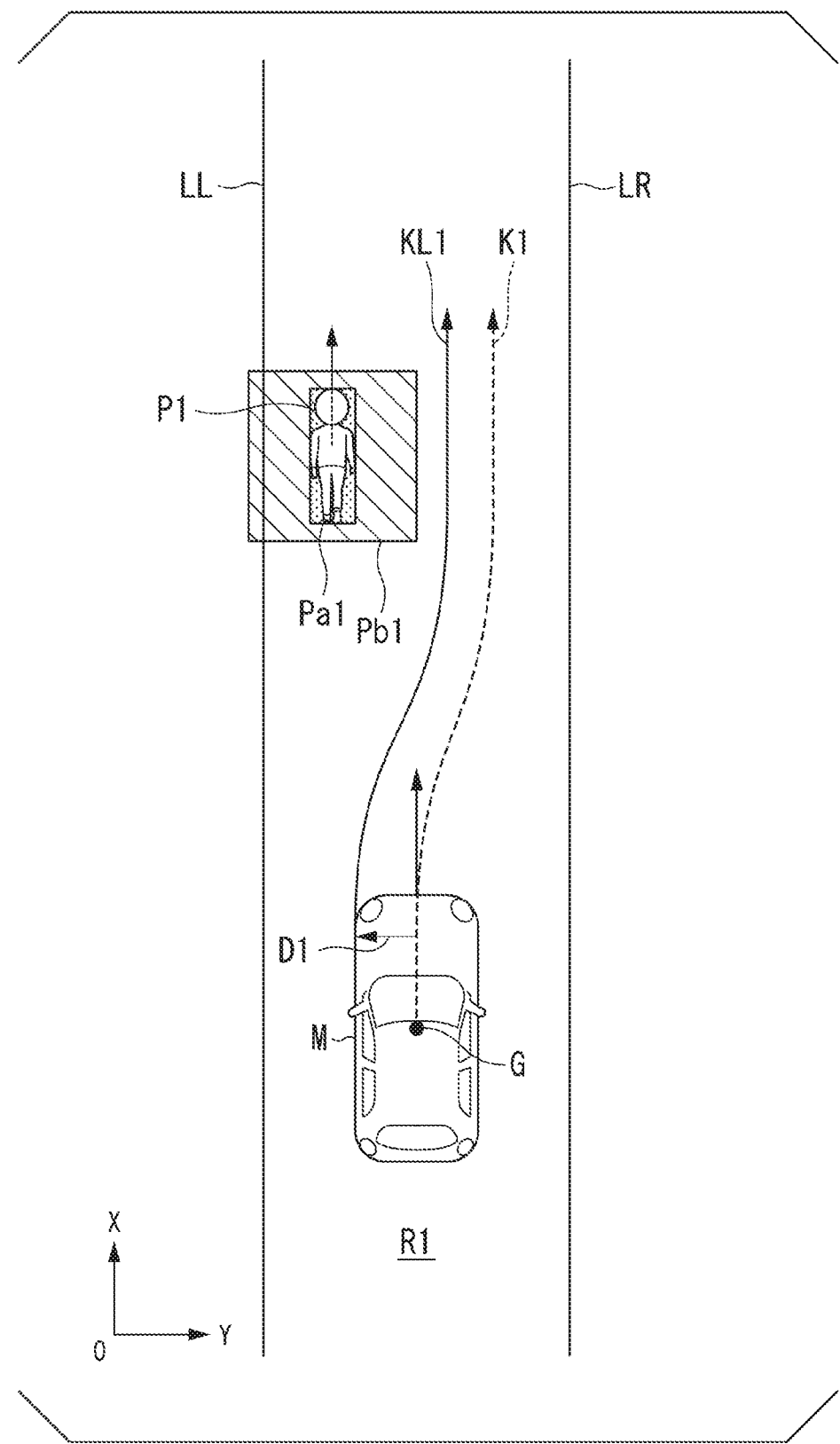
FIG. 5 is a diagram for explaining an example of a process of an overtaking driving control unit.

In a case where the pedestrian P1 who is present in the progress direction of the subject vehicle M is recognized by the recognition unit 130, the overtaking driving control unit 142 generates a target trajectory for the subject vehicle M to overtake the pedestrian P. FIG. 5 is a diagram for explaining an example of a process of the overtaking driving control unit 142.

The overtaking driving control unit 142 sets a pedestrian region Pa1 estimated as a region occupied by the pedestrian P1 on the basis of contour information of the pedestrian P recognized by the recognition unit 130. In the example of FIG. 5, the pedestrian region Pa1 is represented by a rectangle, but instead of this, the pedestrian region Pa1 may be represented by a shape such as a circle or an ellipse with the position of the pedestrian P1 as a reference, or may be represented by a three-dimensional solid. The overtaking driving control unit 142 sets an entry inhibition region Pb1 where an entry of the subject vehicle M is to be avoided with the pedestrian P1 as a reference, on the basis of the degree of recognition estimated by the degree of recognition estimation unit 134.

In the example of FIG. 5, it is assumed that the pedestrian P1 progresses in the same direction as the progress direction of the subject vehicle M and is not aware of the subject vehicle M. In this case, since the degree of recognition by the degree of recognition estimation unit 134 is zero (0), the overtaking driving control unit 142 sets the entry inhibition region Pb1 where the pedestrian region Pa1 is expanded with reference to the pedestrian P1, in consideration of a possibility that the pedestrian P1 will be surprised by the subject vehicle and thus the pedestrian P1 will change the behavior and a possibility in which the pedestrian P1 crosses the road R1 without being aware of the subject vehicle M. Expanding the pedestrian region Pa1 is for example, setting the pedestrian region Pa1 so that the pedestrian region Pa1 includes at least a part of the pedestrian region Pa1 and is wider than the pedestrian region Pa1.

In addition, the overtaking driving control unit 142 temporarily sets a target trajectory K1 through which the center of gravity G of the subject vehicle M passes, and generates an offset trajectory KL1 obtained by offsetting the temporarily set target trajectory K1 in a lateral direction (a road width direction; a Y direction in the figure) by a distance D1 to a left end portion of the subject vehicle M. In addition, in a case where the subject vehicle M overtakes the pedestrian P on a right side, the overtaking driving control unit 142 generates the target trajectory K1 so that the offset trajectory KL1 does not enter the entry inhibition region Pb1. For example, in a case where the offset trajectory KL1 does not enter the entry inhibition region Pb1 and it is not possible for the subject vehicle M to overtake the pedestrian P1 while at least a part of the subject vehicle is not protruded from the road R1, the overtaking driving control unit may generate a target trajectory following the pedestrian P1. Hereinafter, since parts in which after the overtaking driving control unit 142 adjusts the entry inhibition region, the overtaking driving control unit 142 generates the target trajectory of the subject vehicle M on the basis of the adjusted entry inhibition region are the same as in the above-described process, description thereof will be omitted.

Figure 6:
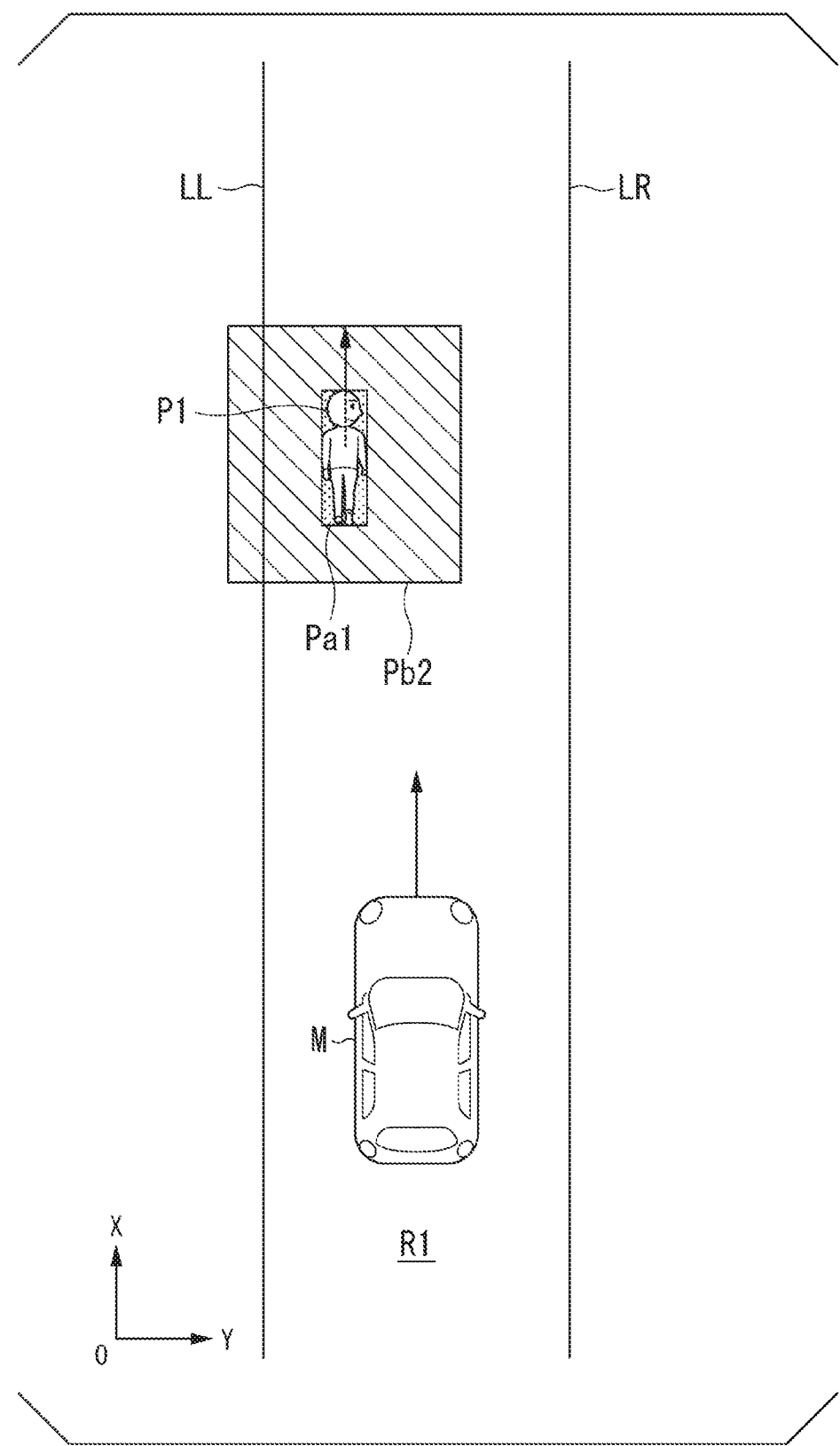
FIG. 6 is a diagram for explaining an example of a process of the overtaking driving control unit in a case where it is estimated that a pedestrian is turning back.

In a case where it is estimated that the pedestrian P1 is turning back by the degree of recognition estimation unit 134, the overtaking driving control unit 142 adjusts the entry inhibition region on the basis of the degree of recognition based on the estimated state. FIG. 6 is a diagram for explaining an example of a process of the overtaking driving control unit 142 in a case where it is estimated that the pedestrian P1 is turning back. In a case where it is estimated that the pedestrian P1 is turning back by the degree of recognition estimation unit 134, the overtaking driving control unit 142 sets an entry inhibition region Pb2 that is larger than the entry inhibition region Pb1 until a predetermined time elapses. A period of time until the predetermined time elapses is, for example, a period from a time at which it has been estimated that the pedestrian P1 is turning back to a time after about several seconds have elapsed. In this case, for example, the overtaking driving control unit 142 may expand the entry inhibition region Pb2 by multiplying the entry inhibition region Pb1 by a predetermined multiplication factor of 1 or more, and may expand the entry inhibition region Pb2 using a value of the degree of recognition. The overtaking driving control unit 142 may cause regions expanded in a longitudinal direction (an extending direction of the road R1; an x direction in the figure) and the lateral direction of the entry inhibition region Pb1 to be different from each other. The overtaking driving control unit 142 may expand a region on the center side of the road R1 (that is, a region on a side where the subject vehicle M overtakes the pedestrian P1) more than a region on the other side.

In a state where the pedestrian P1 is turning back as described above, there is a possibility that the pedestrian P1 has turned back for a purpose other than a purpose of viewing the subject vehicle M. Therefore, the overtaking driving control unit 142 expands the entry inhibition region until the predetermined time elapses, and thus it is possible to implement the driving control for avoiding coming into contact with the pedestrian with a margin, even though the pedestrian P1 approaches the center of the road R1 when turning back, or a child, an elderly person, or the like loses their balance or falls down due to a turning motion.

The overtaking driving control unit 142 sets an entry inhibition region Pb3 that is smaller than the entry inhibition region Pb1 after the predetermined time elapses. Reducing the pedestrian region Pa3 so that the pedestrian region Pa3 is smaller than the entry inhibition region Pb1 is for example, setting the pedestrian region Pa3 so that the pedestrian region Pa3 includes at least a part of the entry inhibition region Pb1 and is not smaller than the pedestrian region Pa1.

Figure 7:
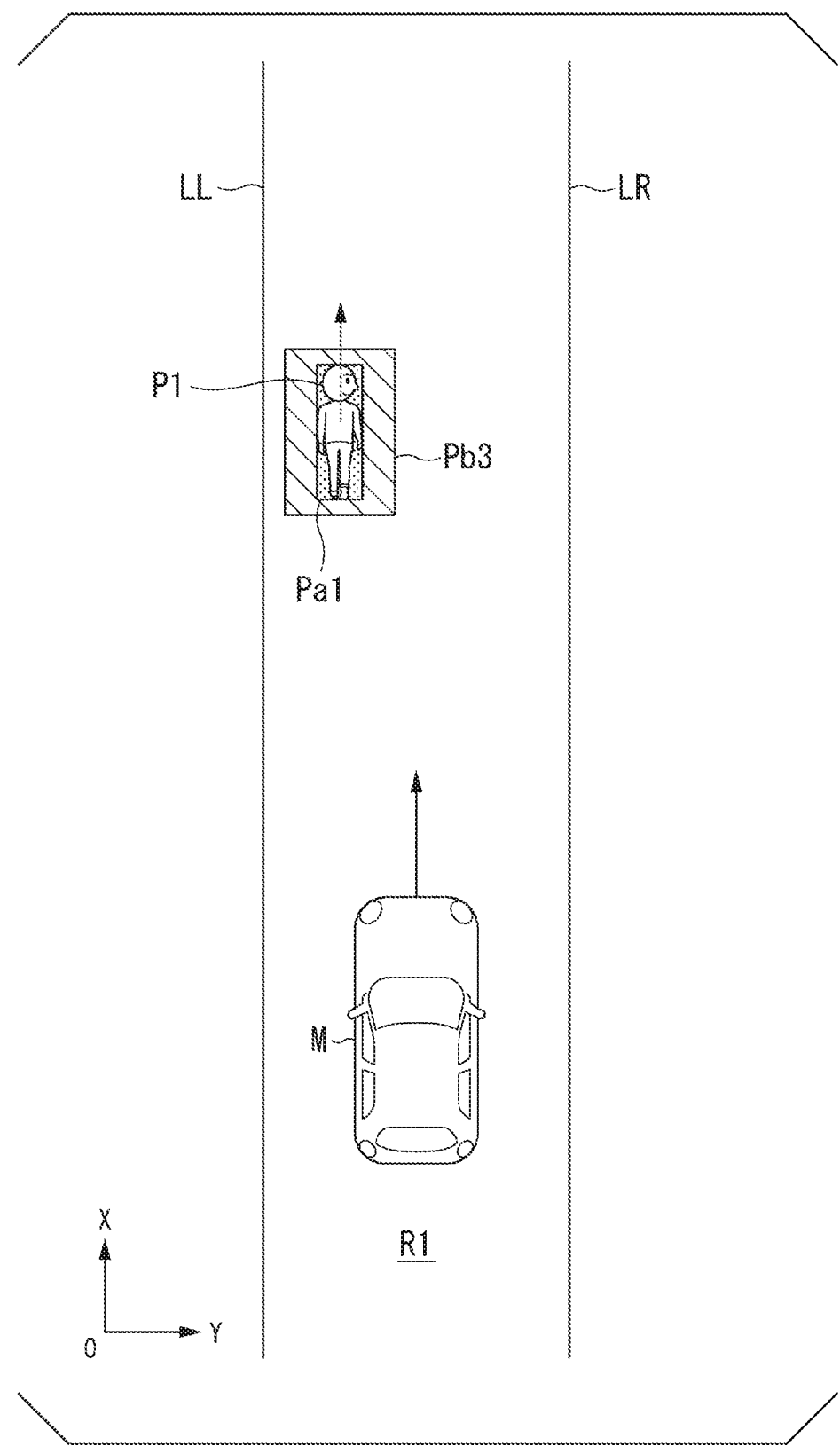
FIG. 7 is a diagram for explaining an example of a process of the overtaking driving control unit after a predetermined time elapses.

FIG. 7 is a diagram for explaining an example of a process of the overtaking driving control unit 142 after the predetermined time elapses. For example, the overtaking driving control unit 142 may reduce the entry inhibition region Pb3 by multiplying the entry inhibition region Pb1 by a predetermined multiplication factor that is less than 1, may reduce the entry inhibition region Pb2 using a value of the degree of recognition, and may cause regions reduced in the longitudinal direction and the lateral direction of the entry inhibition region Pb1 to be different from each other. The overtaking driving control unit 142 may reduce the region on the center side of the road (that is, the region on the side where the subject vehicle M overtakes the pedestrian P1) more than a region on the other side.

As described above, in a case where it is estimated that the pedestrian P1 is turning back, until the predetermined time elapses, the overtaking driving control unit 142 sets the entry inhibition region Pb2 that is wider than the entry inhibition region Pb1 and then sets the entry inhibition region Pb2 that is narrower than the entry inhibition region Pb1. Therefore, it is possible to execute more efficient driving control. This is because even if the pedestrian P1 loses their balance due to a turning motion, it is expected that an original posture will be able to be regained in about several seconds.

Figure 8:
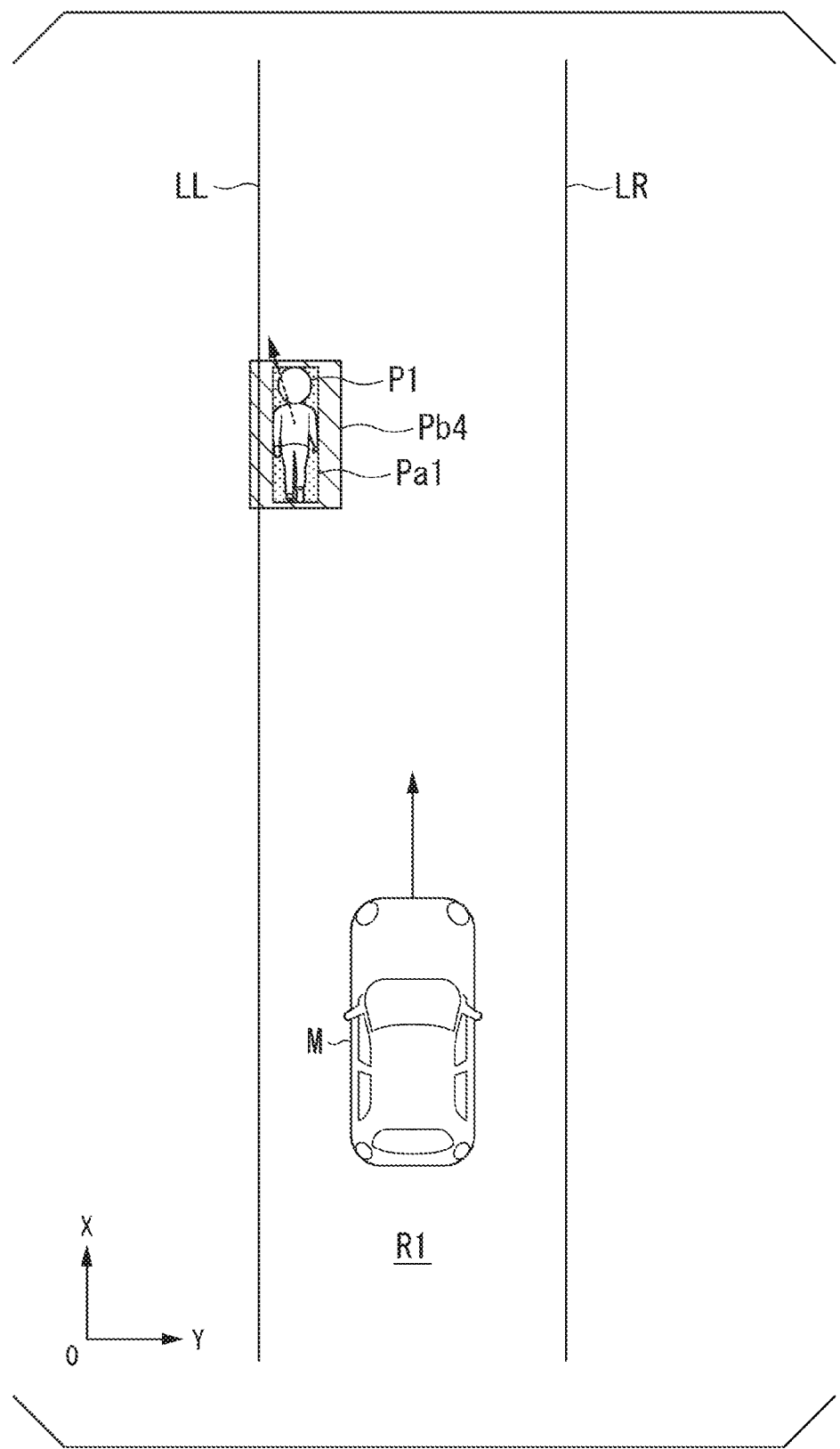
FIG. 8 is a diagram for explaining an example of a process of the overtaking driving control unit in a case where the pedestrian approaches a road end portion.

In a case where it is estimated that the pedestrian P1 is stopped after turning back by the degree of recognition estimation unit 134 or in a case where the pedestrian P1 approaches the road end portion after turning back, the overtaking driving control unit 142 may adjust the entry inhibition region on the basis of the degree of recognitions corresponding to each of the cases. FIG. 8 is a diagram for explaining an example of a process of the overtaking driving control unit 142 in a case where the pedestrian approaches the road end portion. In a case where it is recognized that the pedestrian P1 approaches the end portion of the road R1 (for example, on a side of the road lane marking LL in the figure) by the specific behavior recognition unit 132, the overtaking driving control unit 142 estimates that the pedestrian P1 is aware of the subject vehicle M and performs a behavior for causing the subject vehicle M to overtake the pedestrian P1, and sets an entry inhibition region Pb4 that is smaller than the entry restriction region Pb1 when the pedestrian P1 is not aware of the subject vehicle M. The entry inhibition region Pb4 may be a region narrower than the entry inhibition region Pb3.

The overtaking driving control unit 142 may set the distance between the subject vehicle M and the pedestrian P1, instead of setting the entry inhibition region on the basis of the degree of recognition of the subject vehicle M by the pedestrian P1. In this case, the overtaking driving control unit 142 performs the driving control for overtaking the pedestrian P1 while keeping a distance equal to or greater than a set distance between the subject vehicle M and the pedestrian P1. Therefore, the subject vehicle M is able to overtake the pedestrian while keeping a suitable distance according to the state of the pedestrian.

[Process Flow]

Figure 9:
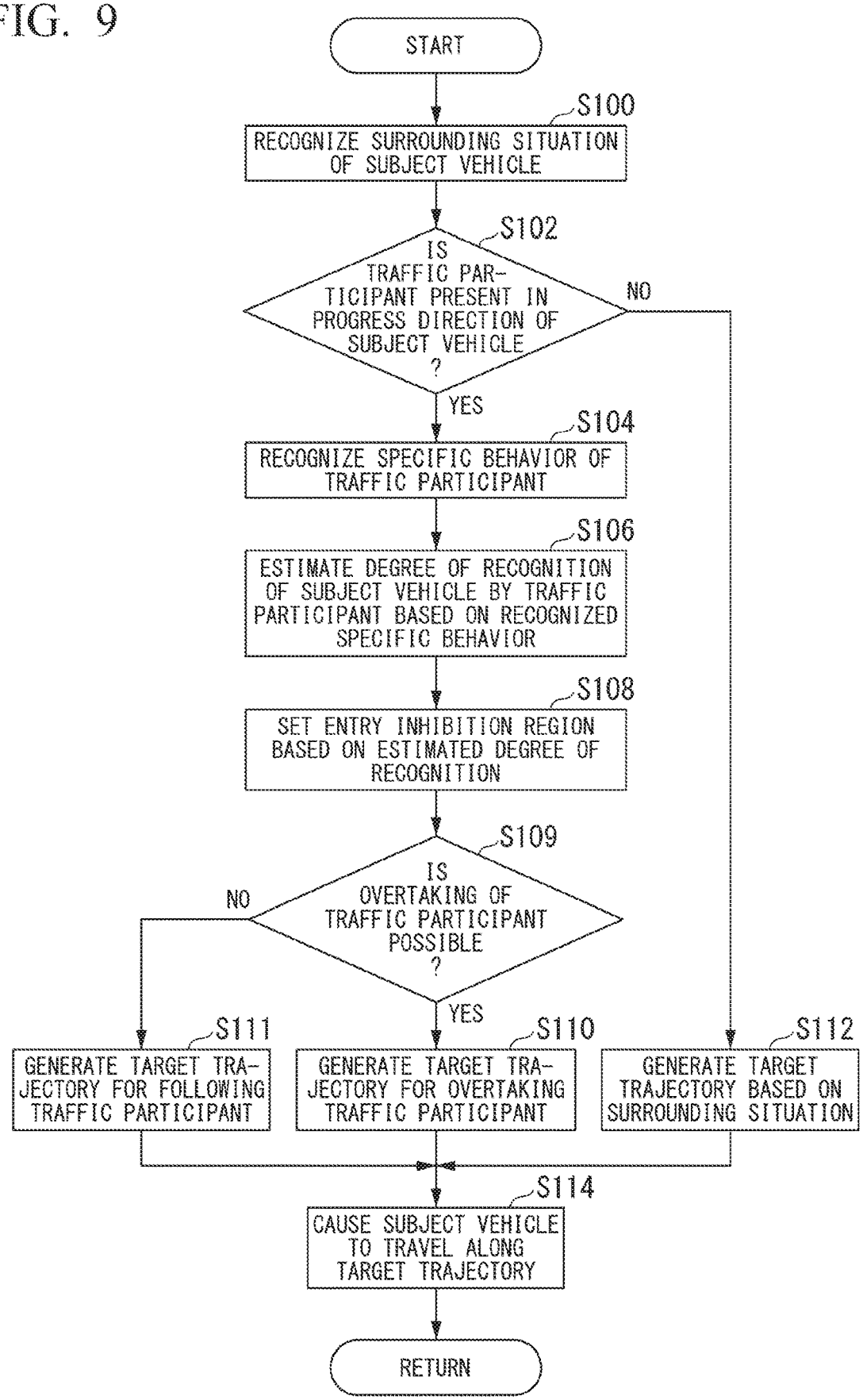
FIG. 9 is a flowchart showing an example of a flow of a process executed by an automated driving control device according to the first embodiment.

FIG. 9 is a flowchart showing an example of a flow of a process executed by the automated driving control device 100 according to the first embodiment. For example, the process of the present flowchart may be repeatedly executed at a predetermined period or at a predetermined timing.

In the example of FIG. 9, the recognition unit 130 recognizes the surrounding situation of the subject vehicle M (step S100). Next, the specific behavior recognition unit 132 determines whether or not the traffic participant is present in the progress direction of the subject vehicle M by the recognition unit 130 (step S102). In a case where it is determined that the pedestrian is present in the progress direction of the subject vehicle M, the specific behavior recognition unit 132 recognizes the specific behavior of the traffic participant (step S104). Next, the degree of recognition estimation unit 134 estimates the degree of recognition of the subject vehicle M by the traffic participant on the basis of the specific behavior of the traffic participant recognized by the specific behavior recognition unit 132 (step S106).

Next, the overtaking driving control unit 142 sets the entry inhibition region on the basis of the estimated degree of recognition (step S108). Next, the overtaking driving control unit 142 determines whether or not the overtaking of the traffic participant is possible (step S109). Specifically, as described above, the overtaking driving control unit 142 determines whether or not the offset trajectory of the subject vehicle M does not enter the entry inhibition region and the subject vehicle M is able to overtake the pedestrian while at least a part of the subject vehicle M is not protruded from the road. In a case where it is determined that it is possible to overtake the traffic participant, the overtaking driving control unit 142 generates the target trajectory for overtaking the traffic participant (step S110). In a case where it is determined that it is not possible to overtake the traffic participant, the overtaking driving control unit 142 generates the target trajectory for following the traffic participant (step S111). In the process of step S102, in a case where it is determined that there is no traffic participant in the progress direction of the subject vehicle M, the action plan generation unit 140 generates the target trajectory on the basis of the surrounding situation of the subject vehicle M (step S112). Next, the second control unit 160 causes the subject vehicle M to travel along the target trajectory generated by step S110, step S111, or step S112 (step S114). Therefore, the process of the present flowchart is ended.

In the example of FIG. 9, instead of the process of step S108, a process of setting the distance between the subject vehicle M and the traffic participant may be added on the basis of the estimated degree of recognition. In this case, the overtaking driving control unit 142 generates a target trajectory for overtaking the traffic participant in a state in which the distance between the subject vehicle M and the traffic participant is equal to or greater than the set distance in the process of step S110.

According to the first embodiment described above, the recognition unit 130 that recognizes the surrounding situation of a vehicle, and the driving control unit 140 and 160 that controls the steering and the acceleration and deceleration of the vehicle on the basis of the surrounding situation recognized by the recognition unit 130 are provided. In a case where the traffic participant to be overtaken in the progress direction of the subject vehicle M is recognized by the recognition unit 130, the driving control unit sets the entry inhibition region where the entry of the subject vehicle M is to be avoided, using the traffic participant as a reference, on the basis the degree of recognition of the subject vehicle M by the traffic participant. Therefore, it is possible to execute a suitable driving control on the basis of the state of the traffic participant.

Specifically, according to the first embodiment, in a case where the degree of recognition of the traffic participant with respect to the subject vehicle M is high, since a possibility that the pedestrian approaches the center of the road is low, the entry inhibition region is reduced, and inversely in a case where the degree of recognition is low, since the possibility that the pedestrian approaches the center of the road is high, the entry inhibition region is expanded. Therefore, it is possible to reduce the possibility of the coming into contact between the subject vehicle M and the traffic participant and to overtake the traffic participant without performing extra steering control of the subject vehicle M. Thus, even in a case where the subject vehicle M travels on a narrow road or a case where there is an obstacle such as a utility pole, a construction site, or an oncoming vehicle in the progress direction of the subject vehicle M, it is possible to execute a suitable driving control on the basis of the surrounding situation.

Second Embodiment

Hereinafter, a second embodiment will be described. In the second embodiment, instead of the automated driving control device 100 of the vehicle system 1, an automated driving control device 100A is provided. As compared with the automated driving control device 100, the automated driving control device 100A includes a behavior pattern categorization unit 135 instead of the degree of recognition estimation unit 134. The degree of recognition table 182 is not stored in the storage unit 180 of the automated driving control device 100A. Hereinafter, differences from the first embodiment will be mainly described.

Figure 10:
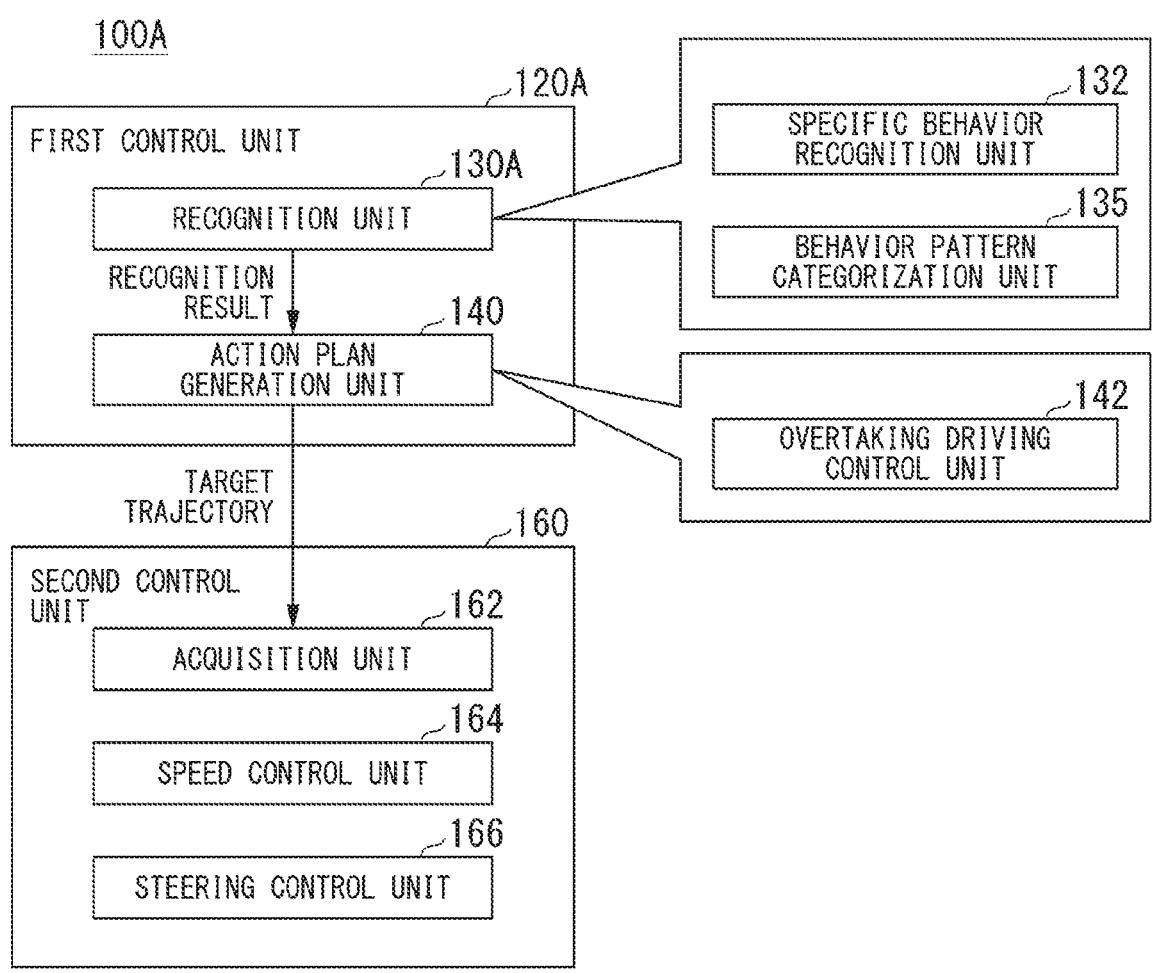
FIG. 10 is a functional constitution diagram of the first control unit and the second control unit according to a second embodiment.

FIG. 10 is a functional constitution diagram of a first control unit 120A and the second control unit 160 according to the second embodiment. The first control unit 120A includes, for example, a recognition unit 130A and the action plan generation unit 140. The behavior pattern categorization unit 135 of the recognition unit 130A categorizes patterns of the behavior of the traffic participant on the basis of the specific behavior of the traffic participant who is present in the progress direction of the subject vehicle M, which is recognized by the specific behavior recognition unit 132. The behavior pattern includes, for example, a pattern in which the pedestrian "is not aware of the subject vehicle M", "turns back", "is aware of the subject vehicle M", "stops after turning back", or "approaches a road end portion after turning back". For example, the behavior pattern categorization unit 135 selects a behavior pattern having the highest degree of similarity with the specific behavior of the traffic participant recognized by the specific behavior recognition unit 132, among a plurality of behavior patterns described above.

The overtaking driving control unit 142 variably sets an entry inhibition region Pb where an entry of the subject vehicle M to be avoided on the basis of the behavior pattern categorized by the behavior pattern categorization unit 135, generates a target trajectory for overtaking the traffic participant on the basis of the set entry inhibition region Pb, and causes the subject vehicle M to travel along the generated target trajectory. The overtaking driving control unit 142 may set the distance between the subject vehicle M and the traffic participant on the basis of the categorized behavior pattern, instead of setting the entry inhibition region Pb where the entry of the subject vehicle is to be suppressed.

[Process Flow]

Figure 11:
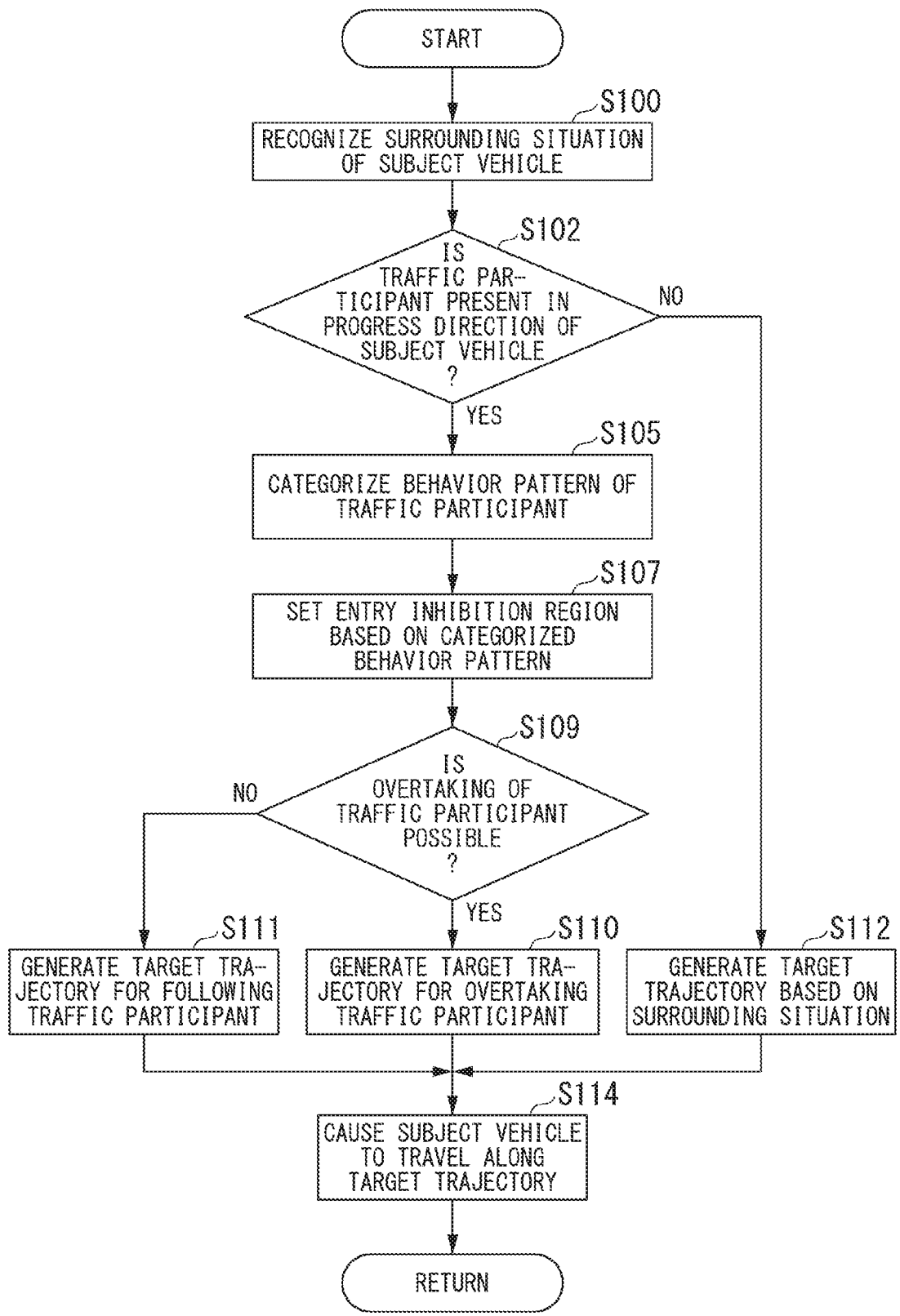
FIG. 11 is a flowchart showing an example of a flow of a process executed by an automated driving control device according to the second embodiment.

FIG. 11 is a flowchart showing an example of a flow of a process executed by the automated driving control device 100A according to the second embodiment. For example, the process of the present flowchart may be repeatedly executed at a predetermined period or at a predetermined timing. The process shown in FIG. 11 includes steps S105 and S107 instead of steps S104 to S108 as compared with the process shown in FIG. 9 which has been described above. Therefore, in the following description, the process of steps S105 and S107 will be mainly described.

In the process of step S102, in a case where the traffic participant is present in the progress direction of the subject vehicle M, the behavior pattern categorization unit 135 categorizes the behavior pattern of the traffic participant on the basis of the specific behavior of the traffic participant recognized by the specific behavior recognition unit 132 (step S105). Next, the overtaking driving control unit 142 sets the entry inhibition region on the basis of the categorized behavior pattern (step S107).

According to the second embodiment described above, in addition to the same effects as those of the first embodiment, it is also possible to adjust the entry inhibition region and the distance between the subject vehicle M and the traffic participant on the basis of the behavior pattern. Each of the first and second embodiments may be combined with a part or all of the other embodiments. In the first and second embodiments, in a case where a plurality of traffic participants are present in the progress direction of the subject vehicle M, for example, the overtaking driving control unit 142 executes the driving control described above with respect to a traffic participant closest to the subject vehicle M.

[Hardware Constitution]

Figure 12:
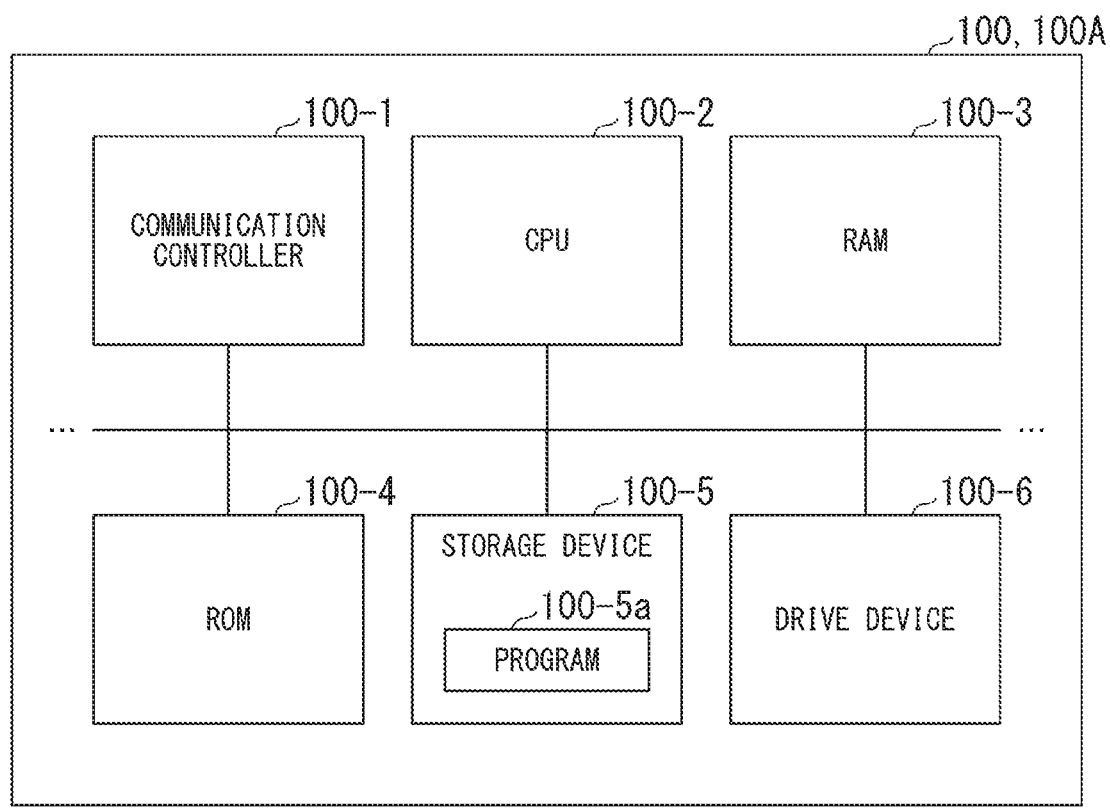
FIG. 12 is a diagram showing an example of a hardware constitution of the automated driving control device.

FIG. 12 is a diagram showing an example of a hardware constitution of the automated driving control device 100 or 100A. As shown in the figure, the automated driving control device 100 or 100A includes a constitution in which a communication controller 100-1, a CPU 100-2, a RAM 100-3 used as a working memory, a ROM 100-4 storing a boot program and the like, a storage device 100-5 such as a flash memory or a HDD, a drive device 100-6 and the like are mutually connected by an internal bus or a dedicated communication line. The communication controller 100-1 communicates with components other than the automated driving control device 100 or 100A. A portable storage medium (for example, a computer-readable non-transitory storage medium) such as an optical disk is attached to the drive device 100-6. A program 100-5a executed by the CPU 100-2 is stored in the storage device 100-5. This program is developed in the RAM 100-3 by a direct memory access (DMA) controller (not shown) or the like and executed by the CPU 100-2. In addition, the program 100-5a referred to by the CPU 100-2 may be stored in the portable storage medium attached to the drive device 100-6 or may be downloaded from another device through a network. Therefore, a part or all of the first control unit 120, the second control unit 160, and the storage unit 180 of the automated driving control device 100 or 100A are realized.

The above-described embodiment is able to be expressed as follows.

A vehicle control device including:

a storage device that stores a program; and a hardware processor, wherein the hardware processor executes the program stored in the storage device to:

recognize a surrounding situation of a vehicle, control steering and acceleration and deceleration of the vehicle based on the recognized surrounding situation, and set an entry inhibition region where an entry of the vehicle is to be avoided, using a traffic participant as a reference, based on a degree of recognition of the vehicle by the traffic participant, in a case where the traffic participant is recognized in a progress direction of the vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims. For example, in the embodiment described above, the pedestrian has been described as the example of the traffic participant, but the traffic participant may be a bicycle. In this case, the same process as in the case of the pedestrian is performed for determining recognition information on the bicycle or the like.

What is claimed is:

1. A vehicle control device comprising:
a recognition unit that recognizes a surrounding situation of a vehicle; and
a driving control unit that controls steering and acceleration and deceleration of the vehicle based on the surrounding situation recognized by the recognition unit,
wherein, in a case where a traffic participant is recognized as moving in a progress direction of the vehicle by the recognition unit, the driving control unit sets an entry inhibition region where an entry of the vehicle is to be avoided, using the traffic participant as a reference, based on a degree of recognition of the vehicle by the traffic participant,
wherein the driving control unit expands the entry inhibition region of a case where it is estimated that the traffic participant moving in the progress direction of the vehicle is turning back until a predetermined time elapses and it is estimated that the traffic participant is aware of the vehicle, as compared with a case where it is estimated that the traffic participant is not aware of the vehicle, based on one or both of a line-of-sight or a motion of the traffic participant.

2. The vehicle control device of claim 1,
wherein the driving control unit estimates the degree of recognition based on the one or both of the line-of-sight or the motion of the traffic participant recognized by the recognition unit.

3. The vehicle control device of claim 1,
wherein the driving control unit reduces the entry inhibition region of a case where it is estimated that the traffic participant is aware of the vehicle as compared with the case where it is estimated that the traffic participant is not aware of the vehicle, based on the one or both of the line-of-sight or the motion of the traffic participant recognized by the recognition unit.

4. The vehicle control device of claim 1,
wherein the driving control unit reduces the entry inhibition region after it is estimated that the traffic participant is turning back and then the predetermined time elapses as compared with the case where it is estimated that the traffic participant is not aware of the vehicle.

5. The vehicle control device of claim 1,
wherein the driving control unit reduces the entry inhibition region of a case where a motion for the traffic participant to cause the vehicle to overtake is estimated as compared with the case where it is estimated that the traffic participant is not aware of the vehicle, based on the one or both of the line-of-sight or the motion of the traffic participant recognized by the recognition unit.

6. A vehicle control device comprising:
a recognition unit that recognizes a surrounding situation of a vehicle; and
a driving control unit that controls steering and acceleration and deceleration of the vehicle based on the surrounding situation recognized by the recognition unit,
wherein, in a case where a traffic participant is recognized as moving in a progress direction of the vehicle by the recognition unit, the driving control unit categorizes a pattern of a behavior of the traffic participant, and sets an entry inhibition region where an entry of the vehicle is to be avoided, using the traffic participant as a reference, based on the categorized pattern of the behavior,
wherein the driving control unit expands the entry inhibition region of a case where it is estimated that the traffic participant moving in the progress direction of the vehicle is turning back until a predetermined time elapses and it is estimated that the traffic participant is aware of the vehicle, as compared with a case where it is estimated that the traffic participant is not aware of the vehicle, based on one or both of a line-of-sight or a motion of the traffic participant.

7. A vehicle control method that causes a vehicle control device to: recognize a surrounding situation of a vehicle; and
control steering and acceleration and deceleration of the vehicle based on the recognized surrounding situation,
wherein, in a case where a traffic participant is recognized as moving in a progress direction of the vehicle, an entry inhibition region where an entry of the vehicle is to be avoided is set, using the traffic participant as a reference, based on a degree of recognition of the vehicle by the traffic participant, and
expanding the entry inhibition region of a case where it is estimated that the traffic participant moving in the progress direction of the vehicle is turning back until a predetermined time elapses and it is estimated that the traffic participant is aware of the vehicle, as compared with a case where it is estimated that the traffic participant is not aware of the vehicle, based on one or both of a line-of-sight or a motion of the traffic participant.

* * * * *